United States Patent [19]

Schmidt et al.

[11] 4,173,867
[45] Nov. 13, 1979

[54] TRANSMISSION

[75] Inventors: Michael R. Schmidt, Ames; David W. Reynolds, Huxley, both of Iowa

[73] Assignee: Sundstrand Corporation, Rockford, Ill.

[21] Appl. No.: 881,710

[22] Filed: Feb. 27, 1978

[51] Int. Cl.² .............................................. F15B 21/04
[52] U.S. Cl. ........................................ 60/456; 60/464; 417/205; 417/228
[58] Field of Search ................ 60/420, 456, 459, 462, 60/464, 486–488; 417/205, 228

[56] References Cited

U.S. PATENT DOCUMENTS

| | | | |
|---|---|---|---|
| 2,383,092 | 8/1945 | Wahlmark | 417/206 |
| 2,931,177 | 4/1960 | Teumer | 60/456 X |
| 2,941,480 | 6/1960 | Sadler et al. | 417/206 |
| 3,385,312 | 5/1968 | Kinnamon et al. | 137/118 |
| 3,750,405 | 8/1973 | Lech et al. | 60/422 |

*Primary Examiner*—Edgar W. Geoghegan
*Attorney, Agent, or Firm*—Wegner, Stellman, McCord, Wiles & Wood

[57] ABSTRACT

A transmission having hydraulic components including a hydrostatic unit with a variable displacement component having a hydraulic displacement control with a lubrication circuit for the components and a charge circuit for supplying fluid under pressure. First and second pumps are connected in series, with the first pump having a larger volume than the second pump to provide fluid to the second pump and to a lubricating circuit. A fluid line connects between the charge circuit and the lubrication circuit and has a lubrication priority valve therein which operates to provide fluid flow from the charge circuit to the lubrication circuit when required to maintain pressure in the lubrication circuit. Additionally, the charge circuit has a pair of branch lines, with one branch line having a charge priority valve therein which functions to control the flow through the one branch line leading to the hydraulic displacement control for the hydrostatic unit and to thus provide pressure control in the other branch line. The charge priority valve additionally controls the pressure in said one branch line by modulating flow thereof relative to a drain port and also has provision for increasing pressure in the other branch line when the speed of the hydrostatic unit exceeds the overspeed rating thereof.

19 Claims, 4 Drawing Figures

TRANSMISSION

BACKGROUND OF THE INVENTION

This invention pertains to a transmission having a hydrostatic unit and which includes lubrication and charge circuits, with means to modify the operation of the transmission to prevent damage thereto upon malfunctioning of components which could affect the pressure in either of the lubrication or charge circuits.

A primary feature of the invention is to provide suitable controls for a transmission having a hydrostatic unit and lubrication and charge circuits to: assure that pressure in the lubrication circuit does not drop below a safe level; reduce the control pressure for the hydrostatic unit to provide for sluggish operation thereof if pressure in the charge circuit goes below a certain level; increase charge pressure as a function of the control pressure for the displacement control of the hydrostatic unit to assure adequate clutch pressures in one or more clutches used in the transmission system; and to provide for an increase of pressure in the charge circuit during overspeed conditions of the hydrostatic unit to avoid damage thereto.

Another object of the invention is to provide a transmission having hydraulic components with a lubrication circuit and a charge circuit, first and second positive displacement pumps in series with the first pump having a larger volume than the second pump, said lubrication circuit and second pump being operatively connected to the outlet of the first pump, said charge circuit being operatively connected to the outlet of the second pump, a fluid line connected between the lubrication circuit and charge circuit, and means in said fluid line for blocking flow therethrough and operable in response to a predetermined drop in pressure in the lubrication circuit for opening said fluid line to permit fluid flow from the charge circuit to the lubrication circuit in order to maintain a desired pressure of fluid in the lubrication circuit.

Still another object of the invention is to provide a transmission as defined in the preceding paragraph wherein the means in the fluid line includes a lubrication relief and priority valve which selectively operates to permit fluid to flow from the charge circuit to the lubrication circuit and which also is responsive to the pressure in the lubrication circuit to limit the pressure in said lubrication circuit.

Still another object of the invention is to provide a transmission having a hydrostatic unit with a variable displacement component having a hydraulic displacement control and with a charge circuit having a pair of branch lines with one branch line connected to the displacement control and the other branch line supplying hydraulic components including make-up fluid for the hydrostatic unit, and a charge priority valve in said one branch line operable to reduce the pressure in said one branch line while maintaining the pressure in the other branch line to result in reduced available pressure for control of the displacement of the hydrostatic unit with resulting sluggish operation thereof when necessary to provide an indication of a problem existing in the transmission.

Still another object of the invention is to provide a transmission, as defined in the preceding paragraph, wherein the charge priority valve is responsive to a control pressure existing in a control servo of the displacement control whereby as said control pressure increases to indicate an increase in output torque of the hydrostatic unit, such control pressure modifies the action of the charge priority valve to increase the pressure in said other branch line in order to assure adequate pressure to hydraulic components, such as clutches connected to said other branch line.

A further object of the invention is to provide a transmission as defined above wherein said charge priority valve is also subject to pressures corresponding respectively to the speed of the hydrostatic unit and the speed of an engine, such as a vehicle engine connected to the transmission and which provides power input to the hydrostatic unit whereby when the hydrostatic unit reaches a speed equal to its overspeed rating, the charge priority valve is caused to operate to increase the pressure in said other branch line in order to meet the requirement that a higher charge pressure is required as a higher hydrostatic unit speed occurs.

DESCRIPTION OF THE PREFERRED EMBODIMENT

Figure 1:
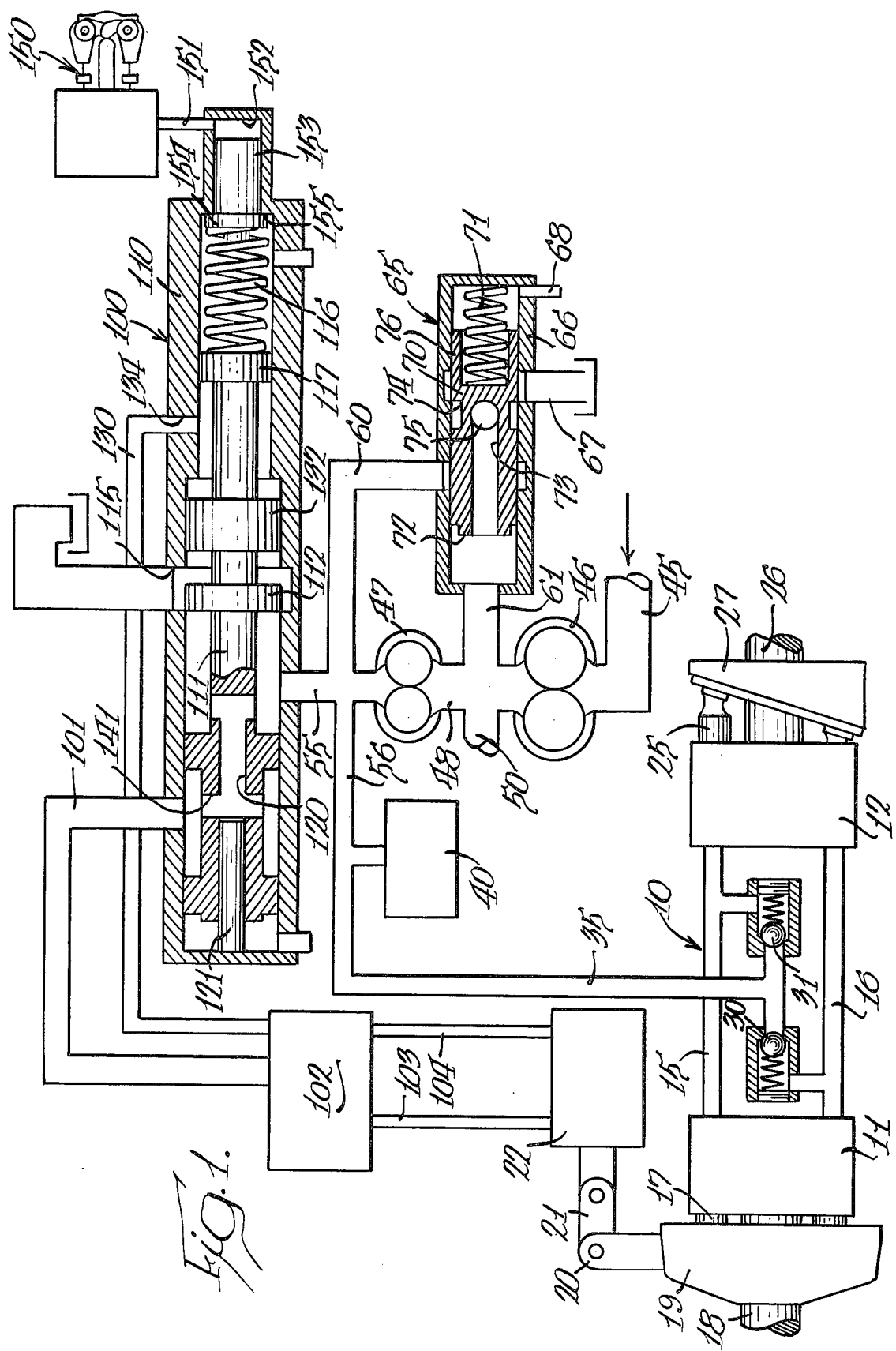
FIG. 1 is a schematic of the transmission with parts in section and parts broken away.

The transmission is shown in FIG. 1. The transmission includes a hydrostatic unit, indicated generally at 10, and having a pair of components 11 and 12 interconnected by hydraulic lines 15 and 16. The components 11 and 12 are fluid displacement units, such as axial piston units, with the variable displacement component 11 having a series of pistons 17 mounted in a rotatable cylinder suitably connected to a shaft 18 connectable to a power source, such as a vehicle engine. The stroke of the pistons 17 is under control of a movable swash plate 19 connected by links 20 and 21 to a control servo 22. The component 12 is a fixed displacement unit, with a series of pistons 25 mounted for rotation in a cylinder block connected to a shaft 26 which is connected to a driven mechanism and with the stroke of the pistons 25 being controlled by a fixed swash plate 27. In operation of the hydrostatic unit, one of the lines 15 and 16 will normally be at relatively high pressure and the other line at a low pressure. Make-up fluid can be supplied to the low pressure line through one or the other of a pair of check valves 30 and 31 having their inlets connected to a line 35 and with the check valve 30 having its outlet connected to the line 16 and the check valve 31 having its outlet connected to the line 15.

This structure of the hydrostatic unit is well-known in the prior art and may be used independently as a hydrostatic transmission or used as a hydrostatic unit which is part of a hydromechanical transmission wherein the shaft 26 of the hydrostatic unit is connected directly, or indirectly through a selectively operable clutch, to one or more elements of planetary gear structure. In a hydromechanical transmission, the prime mover shaft, such as the drive shaft of an engine, would also be directly, or indirectly, through one or more clutches connected to other elements of the planetary gearing. In such hydromechanical transmission, the clutch or clutches may be hydraulically controlled with the hydraulic control and clutches and clutch control being identified by a control unit 40. This structure is known in the art and with an illustrative embodiment thereof being shown in the copending application of Pollman et al Ser. No. 825,844, filed Aug. 18, 1977.

A fluid line 45 connectable to a source of fluid supplies fluid to a first pump 46 and a second pump 47 connected in series through an intermediate line 48. These pumps are positive displacement pumps, with the first pump 46 being a cooling pump which delivers hydraulic fluid to a lubrication circuit having a line 50. This lubrication circuit provides fluid for cooling and lubricating hydraulic components of the transmission. The second pump 47 is a charge pump and has a smaller displacement or volume than the cooling pump 46 whereby, in normal operation, the cooling pump 46 supplies adequate fluid to fully supply the demand of the charge pump 47 and also fluid for the lubrication circuit. As known in the art, the cooling pump 46 and charge pump 47 may be drivingly connected to the prime mover engine and, thus, rotate at a rate proportional to the speed of the engine.

In a hydrostatic or hydromechanical transmission, there can be severe damage to the components if the transmission continues to operate when pressure in the lubrication circuit is not adequate. If flow in the lubrication circuit should drop, as might occur under conditions of malfunctioning of the cooling pump 46, for example, a restriction in the inlet line 45 or fluid aeration, means are provided in order to supplement the lubricating flow with flow from the outlet of the charge pump 47. The outlet of the charge pump 47 is connected to a charge circuit including a pair of branch lines with one branch line indicated at 55 and a second branch line at 56. In order to supplement the flow in the lubrication circuit, a fluid line, having sections 60 and 61, connects the charge circuit with the lubrication circuit and control of the flow therethrough is by a lubrication relief and priority valve, indicated generally at 65. The lubrication priority valve has a casing 66 with ports that connect to the line sections 60 and 61 as well as a drain port 67 and a vent port 68. A valve member 70 is movably mounted in the casing and is normally urged to the left, as viewed in FIG. 1, by a spring 71. Pressure in the lubrication circuit acts on an end face 72 of the valve member as well as the base of an open-ended longitudinal bore 73 in the valve member. The base of the bore 73 communicates with an annular external groove 74 on the valve member through at least one radial passage 75.

In normal operation with the pressure in the lubrication circuit of a desired value, the valve member is positioned as shown in FIG. 1, with the fluid line sections 60 and 61 blocked and with the drain port 67 also blocked by a land 76 on the valve member. When the lubrication circuit pressure drops below a predetermined value, as set by the force of the spring 71, the valve member 70 moves to the left and to a position wherein the annular groove 74 aligns with the fluid line section 60 whereby fluid from the charge circuit can flow through the radial passage 75 and longitudinal bore 73 to the fluid line section 61 to have charge circuit fluid added to the lubrication circuit.

The lubrication relief and priority valve 65 modulates to maintain a minimum pressure in lubrication circuit as determined by the load of the spring 71. When an excessive pressure occurs, the valve member 70 moves to the right and fluid flows through bore 73 and radial passage 75 to the drain port 67.

Figure 2A:
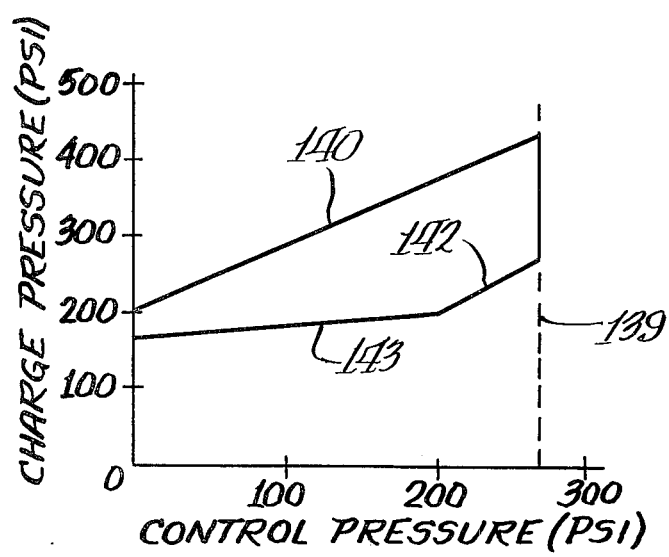
FIG. 2A is a graph plotting charge pressure against control pressure.
Figure 2B:
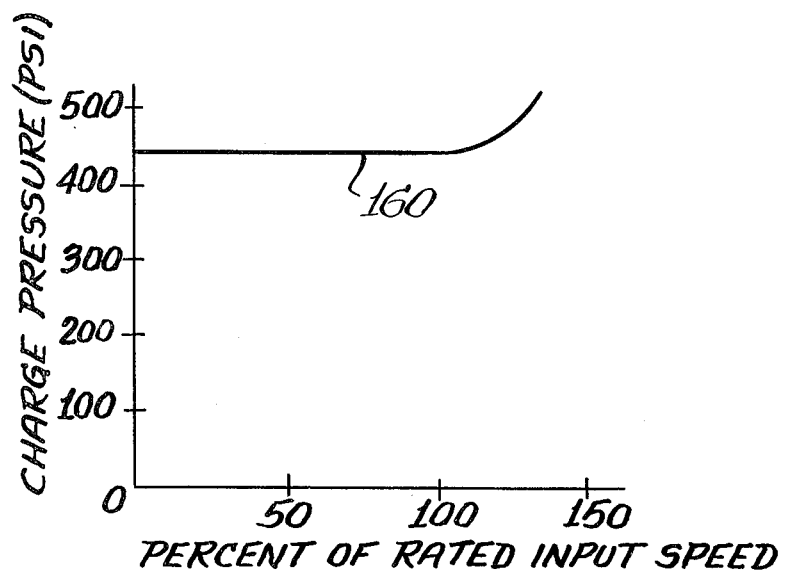
FIG. 2B is a graph plotting charge pressure against percent of rated input speed.
Figure 2C:
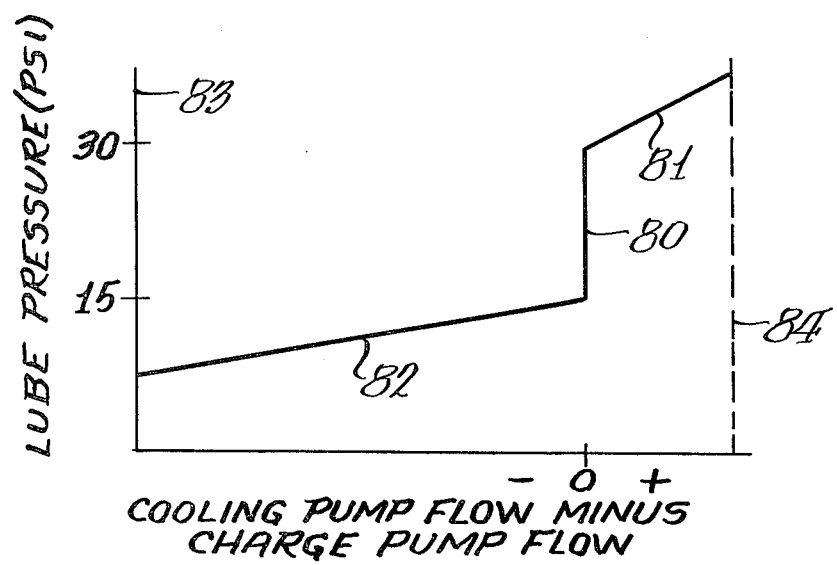
FIG. 2C is a graph plotting lubrication circuit pressure against cooling pump flow minus charge pump flow.

The above-described action is shown in the graph of FIG. 2C wherein lube pressure, which is pressure in the lubrication circuit, is plotted relative to the flow of cooling pump 46 minus the flow of charge pump 47 and with the values being given merely for illustrative purposes. The plot of pressure against the flow shows a vertical line section 80 wherein the lubrication priority valve 65 is inactive and with lubrication circuit pressure generally in the range from 15 to 30 psi. At the upper value of approximately 30 psi, the line section 81 shows that with increasing lube pressure a part of the fluid delivered by the cooling pump 46 is directed to drain to the drain port 67. The line section 82 of the graph shows that when the lubrication circuit pressure drops below approximately 15 psi, the lubrication priority valve 65 operates to progressively provide for increasing flow from the charge circuit by shift of the valve member 70 to the left, as viewed in FIG. 1. The ordinate line 83 indicates the maximum flow available from the charge circuit while the vertical broken line 84 indicates the maximum flow available from the difference in the capacities of the cooling pump 46 and charge pump 47.

In the graph of FIG. 2C, the condition indicated at "O" would represent a situation, for example, where the cooling pump 46 was giving two units of volume and the charge pump 47 was utilizing one unit of volume, with the difference supplying the lubrication circuit. When lube pressure increases to a value above approximately 30 psi, then fluid is discharged to drain by the lubrication relief and priority valve. Conversely, when the lube pressure becomes less than approximately 15 psi operation is in the "—" area where the charge pump output is partially returned to the lubrication circuit.

The charge pump 47 supplies fluid to the charge circuit branch lines 55 and 56 with the branch line 56 connected to the line 35 for supplying make-up fluid to the hydrostatic unit in a known manner and to the control unit 40 which provides hydraulic control other than the controls for positioning of the swash plate 19.

The charge circuit has a charge priority valve, indicated generally at 100, connected in the branch line 55 which accepts fluid flow from the charge pump 47. The charge priority valve 100 controls the delivery of charge fluid through a line 101 to swash plate positioning controls, indicated at 102, which are conventional and known in the art. The displacement control has a pair of lines 103 and 104 connected to opposite ends of the control servo 22 which may be in the form of a piston and cylinder unit with a spring-centered piston whereby pressure in either one of the lines 103 or 104 controls the position of the piston of the control servo and, thus, the position of the swash plate 19.

Additionally, the charge priority valve 100 functions to give priority to the pressure in the charge circuit branch 56.

The charge priority valve has a casing 110 in which a valve member 111 is movably positioned. The valve member 111 has a centrally-located land 112 which normally coacts with a drain port 115 to modulate relative to the drain port and maintain a desired pressure in the charge circuit. This modulation is obtained by the combined action of a spring 116 positioned at one end of the valve casing engaging an end member 117 of the valve member and by pressure in the charge branch line 55. This pressure acts through an internal longitudinal passage 120 in the valve member and on a piston 121 movably positioned therein with an end of the piston abutting an end wall of the valve casing 110. Charge circuit pressure within the valve passage 120 acts against an area of the valve member to urge the valve member to the right, as viewed in FIG. 1, and the resulting force acts in opposition to the preset load on the spring 116 whereby the position of the valve land 112 relative to the drain port 115 is controlled to maintain a predetermined pressure in the charge circuit upstream of the charge priority valve. An added variable is provided in the modulation of the priority valve by use of the control pressure existing at the control servo 22 for the swash plate 19. This control pressure is directly proportional to the pressure within the hydrostatic unit 10 and, therefore, to output torque. The control pressure is sensed at the displacement control unit 102 by a line 130 extending to a port 134 of the charge priority valve 100. The control pressure is applied to the valve member to act in a direction to urge the valve member toward the left because of a differential provided by the land 132 of the valve member which is of a diameter greater than the end member 117 thereof. In maintaining the pressure in the charge circuit upstream of the priority valve, the position of the valve member 111 and land 112 thereof is determined by the pressure in valve member passage 120 acting in opposition to the pre-set load on the spring 116 as well as the control pressure acting on the differential area of the valve member.

The relation between charge pressure and the control pressure is shown in the graph of FIG. 2A, with the values assigned thereto being merely for illustrative purposes.

In FIG. 2A, a broken line 139 indicates the maximum control pressure with a line 140 indicating the upper limit of normal system function and, more particularly, shows an upper limit for charge pressure related to control pressure. If charge flow should drop, such as could occur because of pump malfunction, excessive leakage, or lubrication circuit priority operation, the pressure in the charge circuit as at branch line 56 drops. This results in increasing the seal at the drain port 115 by the land 112 and further movement of the valve member 111 to the left causes the piston 121 to gradually reduce a radial opening 141 from the valve passage 120 to the line 101 and restrict flow to the displacement control 102. This flow restriction reduces available control pressure to the control servo 22 and the ability of the hydrostatic unit 10 to maintain pressure. If charge pressure drops to a certain level, the flow to the line 101 will be cut off entirely and the hydrostatic transmission 10 ceases to function, but will not be damaged beyond repair. The lower charge pressure effects on control pressure are shown in FIG. 2A, with a line section 142 showing a relation between a drop in charge pressure and control pressure until a line section 143 is reached which shows the lower limit of pressure for causing malfunctioning of the hydrostatic transmission 10. When the hydrostatic unit 10 does not maintain pressure, this induces sluggish operation of the transmission and is an indication to an operator of a problem before excessive damage results.

An additional function of the feedback of control pressure through line 130 to the charge priority valve 100 is to increase the charge pressure in charge branch line 56 as a function of the control pressure at the control servo 22. This control pressure is directly proportional to the system pressure of the hydrostatic unit 10 and, therefore, output torque. This increase in charge pressure resulting from an increase in control pressure insures adequate pressures for maintaining clutch engagement as the hydraulic output torque level increases.

In the event of an engine overspeed, such as the engine of a vehicle, charge pressure must be higher than normal in order to prevent damage to the components of the hydrostatic unit 10. The engine speed responsive valve means, indicated generally at 150, is a unit known in the art which converts engine speed to a pressure signal which is supplied through a line 151 to a chamber 152 at an end of the valve casing 110 for action on a plunger 153 movable therein. This plunger has a cap 154 engaging with the spring 116 and which limits the movement of the plunger to the right by engagement with a valve casing shoulder 155. The pressure in chamber 152 increases as a function of increasing engine speed. The spring 116 has a pre-set load which equally opposes the engine speed pressure at the overspeed rating of the hydrostatic unit 10 acting on the area of the plunger 153. It will be understood that during this time the left end of the spring 116 is supported by the valve member 111 which is modulating the pressures as previously described. Therefore, engine speed pressure changes up to overspeed rating do not cause any increase in the charge pressure in charge branch line 56. As speed increases above rated overspeed, the charge pressure is required to increase to deter damage to the hydrostatic unit 10 because of the overspeed condition. An increase in engine speed pressure on the plunger 153 above a certain value overcomes the load of spring 116 and begins increasing the spring load which changes the modulating action to result in an increase of charge pressure. The build-up in this pressure continues until the valve member 111 again returns to a balanced condition.

A graph showing charge pressure as a function of rated speed of the hydrostatic unit 10 is shown in FIG. 2B with the unit values being for illustrative purposes only and with the line 160 showing an increase in charge pressure commencing as the percent of rated input speed slightly exceeds 100%.

With the transmission having the lubrication and charge circuit combination with priority and relief valves, as disclosed herein, it will be noted that lubrication pressure is maintained above a safe level and that charge pressure can be increased when required. Also, sluggish operation of the transmission occurs if charge pressure falls below a predetermined level.

We Claim:

1. A transmission having hydraulic components with a lubrication circuit and a charge circuit, first and second positive displacement pumps in series with said first pump having a larger volume than the second pump, said lubrication circuit and second pump being operatively connected to the outlet of the first pump, said charge circuit being operatively connected to the outlet of said second pump, a fluid line connected between said lubrication circuit and charge circuit, and means in said fluid line for blocking fluid flow therethrough and operable in response to a predetermined drop in pressure in the lubrication circuit for opening said fluid line to permit fluid flow from the charge circuit to the lubrication circuit.

2. A transmission as defined in claim 1 wherein said means in the fluid line comprises a priority valve with a valve member normally urged to a position to open said fluid line and subject to pressure in the lubrication circuit to provide a force acting to close said fluid line.

3. A transmission as defined in claim 2 wherein said priority valve has a drain port and said normal urging of the valve member is in a direction to block said drain port.

4. A transmission as defined in claim 1 including a hydrostatic power unit with a variable displacement component having a hydraulic displacement control, a charge circuit priority valve operatively connected to said charge circuit and to said displacement control to control the hydraulic flow to the displacement control, and said charge circuit priority valve having means responsive to a predetermined drop in charge pressure as may be caused by opening of said fluid line to reduce the pressure of hydraulic fluid delivered to the displacement control.

5. A lubrication and charge circuit combination for a transmission with hydraulic components comprising, first and second positive displacement pumps connected in series by a flow line with the first pump supplying the second pump and of a larger volume, a lubrication circuit connected to said flow line, a charge circuit operatively connected to the outlet of said second pump, a fluid line connecting said lubrication and charge circuits, a lubrication priority valve connected in said fluid line and having a drain port and a valve member having an area exposed to pressure in the lubrication circuit, spring means acting on the valve member in opposition to lubrication circuit pressure for control of flow through said fluid line with said valve member movable to a position to open the fluid line by said spring means, a flow passage through the valve member and opening to said area and having an outlet connectable to the drain port when the lubrication circuit pressure exceeds a predetermined value.

6. A transmission as defined in claim 5 including a hydrostatic power unit with a variable displacement component having a hydraulic displacement control, a charge circuit priority valve operatively connected to said charge circuit and to said displacement control to control the hydraulic flow to the displacement control, and said charge circuit priority valve having means responsive to a predetermined drop in charge pressure flow to reduce the pressure of hydraulic fluid delivered to the displacement control.

7. A lubrication and charge circuit combination for a transmission having a hydrostatic unit with a variable displacement component and a hydraulic displacement control comprising, a lubrication circuit for supplying lubricating fluid, a charge circuit having a pair of branch lines with one branch line supplying the displacement control and the other branch line supplying other hydraulic components, a lubrication priority valve connected in a fluid line between said circuits to provide for fluid flow from the charge circuit to the lubrication circuit when required to maintain pressure in the lubrication circuit, and a charge priority valve connected in said one branch line and operable to progressively restrict said one branch line as charge pressure decreases from a predetermined value.

8. A combination as defined in claim 7 wherein said charge priority valve has means to connect said one branch line to drain when the charge pressure increases above a predetermined value.

9. A transmission having hydraulic components including a hydrostatic unit with a variable displacement component and a hydraulic displacement control, a charge circuit having a pair of branch lines with one branch line connected to supply fluid for the displacement control and the other branch line supplying the hydrostatic unit, and a charge priority valve in said one branch line and including means responsive to a drop in charge pressure below a predetermined level to progressively restrict flow in said one branch line.

10. A transmission as defined in claim 9 wherein said charge priority valve includes means responsive to an increase in charge pressure above a predetermined level to progressively increase discharge of charge flow to drain.

11. A transmission as defined in claim 10 wherein the change priority valve means includes a valve member subject to a control pressure and spring means to move in a direction to restrict flow and subject to charge pressure acting in opposition to said control pressure and spring means to move in a direction to increase charge flow to drain.

12. A transmission as defined in claim 11 wherein said variable displacement component is an axial piston unit and with a movable swashplate and said hydraulic displacement control includes a control servo for positioning of said swashplate, and a line operatively connected to said control servo for delivering the pressure existing therein to said charge priority valve to act as said control pressure.

13. A transmission having hydraulic components including a hydrostatic unit with a variable displacement component and a hydraulic displacement control including a control servo, a charge circuit having a pair of branch lines with one branch line connected to supply fluid for the displacement control and the other branch line supplying the hydrostatic unit, and a charge priority valve in said one branch line and including means responsive to a control pressure existing in the control servo to progressively restrict flow in said one branch line and build up pressure in the other branch line as the control of pressure increases.

14. A transmission as defined in claim 13 wherein said charge priority valve has a pair of opposed control areas with one area exposed to pressure in said one branch line and other area acted upon by said control pressure.

15. A transmission having hydraulic components including a hydrostatic unit with a variable displacement component and a hydraulic displacement control, a charge circuit having charge pressure and a pair of branch lines with one branch line connected to supply fluid for the displacement control and the other branch line supplying the hydrostatic unit, and a charge priority valve in said one branch line and including means responsive to operation at a speed in excess of the over-speed rating of the hydrostatic unit to increase the charge pressure.

16. A transmission as defined in claim 15 wherein said means includes a valve member which modulates flow in said one branch line to a drain port, means responsive to pressure in the one branch line acting in opposition to a control pressure to modulate said valve member, and additional means responsive to a pressure indicating engine speed in excess of a certain value to shift said valve member to a position to cause said increase in the charge pressure.

17. A transmission having hydraulic components including a hydrostatic unit with a variable displacement component having a hydraulic displacement control with a control servo, a charge circuit having two branch lines with one branch line for supply of the displacement control and the other branch line for supply of other components including the hydrostatic unit, a charge priority valve in said one branch line and having a drain port and a control pressure port, a valve member having a land for controlling connection to the drain port and opposed areas subject to pressure in said one branch line and a control pressure, a spring with a preset load acting on the valve member in conjunction with the control pressure to cause modulation of the valve land relative to the drain port, means for applying the control servo pressure to the priority valve as the control pressure, and means associated with the valve member for restricting flow through said one branch line as said land moves to close said drain port whereby said priority valve can control the pressure in both of said branch lines.

18. A transmission as defined in claim 17 wherein a movable piston coacts with said spring, and means for applying a pressure to said piston representative of engine speed whereby a predetermined engine speed pressure will shift said valve member in a direction to increase charge pressure.

19. A transmission as defined in claim 18 including a charge pump for the charge circuit, a larger volume pump for supplying the charge pump and a lubrication circuit, a fluid line connecting the charge circuit and the lubrication circuit, and a lubrication priority valve in said last-mentioned fluid line with means to permit fluid flow from the charge circuit to the lubrication circuit when required to maintain pressure in the lubrication circuit.

* * * * *